United States Patent
Tian (10) Patent No.: US 9,442,794 B1
(45) Date of Patent: Sep. 13, 2016

(54) METHODS AND APPARATUS FOR ACCESSING DEVICE MEMORY VIA A HOST BUS INTERFACE

(71) Applicant: Marvell International Ltd., Hamilton (BM)

(72) Inventor: Fuhou Tian, Redmond, WA (US)

(73) Assignee: Marvell International Ltd., Hamilton (BM)

(*) Notice: Subject to any disclaimer, the term of this patent is extended or adjusted under 35 U.S.C. 154(b) by 143 days.

(21) Appl. No.: 14/543,642

(22) Filed: Nov. 17, 2014

Related U.S. Application Data (60) Provisional application No. 61/907,590, filed on Nov. 22, 2013.

(51) Int. Cl.
*G06F 11/00* (2006.01)
*G06F 11/07* (2006.01)

(52) U.S. Cl.
CPC ....... *G06F 11/0793* (2013.01); *G06F 11/0745* (2013.01); *G06F 11/0778* (2013.01)

(58) Field of Classification Search
CPC ........... G06F 11/0745; G06F 11/0757; G06F 11/0772; G06F 11/0778; G06F 11/0784; G06F 11/0793
See application file for complete search history.

(56) References Cited

U.S. PATENT DOCUMENTS

| | | | | |
|---|---|---|---|---|
| 8,407,526 | B1* | 3/2013 | Righi | G06F 11/366 714/25 |
| 9,274,894 | B1* | 3/2016 | Perry | G06F 11/1412 |
| 2008/0072103 | A1* | 3/2008 | Lou | G01R 31/31705 714/38.14 |
| 2014/0372740 | A1* | 12/2014 | Semenko | G06F 11/0766 713/2 |
| 2015/0186232 | A1* | 7/2015 | Conner | G06F 11/2268 714/45 |

* cited by examiner

*Primary Examiner* — Marc Duncan (57) ABSTRACT

In aspects of accessing device memory via a host bus interface, a computing system includes a device that is integrated in the computing system, and the device has device firmware that controls operation of the device. The computing system also includes a device driver that is executable by a processor of the computing system. The device driver is implemented to monitor whether an exchange of control messages between the device driver and the device firmware via a data bus has stalled. In response to determining that the exchange of the control messages has stalled, a debug function of the device firmware is initiated. The debug function is implemented to transfer firmware data from firmware memory to a data bus register of the device, and the device driver can then access the data bus register to obtain the firmware data that is transferred from the firmware memory.

20 Claims, 5 Drawing Sheets

METHODS AND APPARATUS FOR ACCESSING DEVICE MEMORY VIA A HOST BUS INTERFACE

CROSS REFERENCE TO RELATED APPLICATION(S)

This application claims priority to U.S. Provisional Patent Application Ser. No. 61/907,590 filed Nov. 22, 2013, the disclosure of which is incorporated by reference herein in its entirety.

BACKGROUND

Computing devices, such as computers, mobile phones, tablet devices, digital cameras, multimedia devices, printers, and many other types of wired and wireless devices likely include a wireless communication device, such as for Wi-Fi data communication. The computing devices are generally integrated with Wi-Fi chips of the wireless communication device, and in conventional designs, the software that manages and controls the Wi-Fi wireless device includes a host device driver that executes on a host central processing unit (CPU) of the computing device (e.g., the main CPU of a mobile phone), and includes firmware that executes on the wireless communication device side (e.g., on the Wi-Fi chip). In the computing device, the host device driver and the firmware communicate with each other via one or more data buses, such as a secure digital input output (SDIO), a universal serial bus (USB), a peripheral component interconnect express (PCIE) bus, and the like.

Generally, data traffic is exchanged between the host device driver on the mobile phone and the wireless device firmware via a data bus. The data traffic includes control messages, such as commands, command responses, and events. For example, a command may be communicated from the host device driver to the wireless device firmware via the data bus, such as to direct an operation of the wireless device. A command response is then communicated back from the wireless device to the host device driver as an acknowledgement of the command. The wireless device firmware can also initiate an event control message to report a situation or status of the wireless device to the host device driver.

The wireless device firmware may develop a bug or become inoperable, which can stall or delay the control messages between the host device driver and the wireless device firmware. For example, the host device driver may initiate a command to the wireless device via the data bus, but not receive a response as an acknowledgement of the command from the host device driver. When the wireless device firmware becomes inoperable, the firmware needs to be debugged. However, in commercial implementations (e.g., in a mobile phone or tablet device that is in use by a consumer), Wi-Fi firmware debugging is not available, such as by "printing" run-time logs of the wireless device firmware, neither to a serial port which is too time consuming, nor to external non-volatile storage which is costly.

In development, the Wi-Fi firmware can be connected via a Joint Test Action Group (JTAG) interface to determine run-time status and errors. However, JTAG is generally only available as a port on development boards, rather than in the commercial implementations, such as in a consumer mobile phone or tablet device. In a consumer device, a conventional technique to debug the wireless device firmware is to analyze the data logs from the host device driver side. However this may only provide some indirect information about the wireless device firmware before the firmware fails, but does not provide insight as to what caused the wireless device firmware to stall or become inoperable.

SUMMARY

This Summary introduces concepts of accessing device memory via a host bus interface, and the concepts are further described below in the Detailed Description and/or shown in the Figures. Accordingly, this Summary should not be considered to describe essential features nor used to limit the scope of the claimed subject matter.

In one aspect of accessing device memory via a host bus interface, a computing system includes a device that is integrated in the computing system, and the device has device firmware that controls operation of the device. The computing system also includes a device driver that is executable by a processor of the computing system. The device driver is implemented to monitor whether an exchange of control messages between the device driver and the device firmware via a data bus has stalled. In response to determining that the exchange of the control messages between the device driver and the device firmware via the data bus has stalled, a debug function of the device firmware is initiated. The debug function is implemented to transfer firmware data from firmware memory to a data bus register of the device, and the device driver can then access the data bus register to obtain the firmware data that is transferred from the firmware memory.

A method is described for exchanging control messages between a device driver and a device firmware via a data bus, where the device driver is executed by a processor of a computing system, and the device firmware is implemented in a device that is integrated in the computing system. The method also includes monitoring whether the exchange of the control messages between the device driver and the device firmware has stalled, and in response to the exchange of the control messages between the device driver and the device firmware being stalled, initiating a debug function of the device firmware. The debug function transfers firmware data from firmware memory to a data bus register of the device, and the method includes accessing the data bus register to obtain the firmware data that is transferred from the firmware memory.

Another method is described for determining that device firmware has stalled in a device that is integrated in a computing system, and communicating a trigger signal from a device driver to the device firmware, where the trigger signal is written as a designated value in position zero of a data bus register on the device. The method also includes executing a debug function of the device firmware that performs operations of determining the designated value written to the position zero of the data bus register, transferring data from firmware memory to position one of the data bus register based on the determination of the designated value, and changing the designated value to a changed value written to the position zero of the data bus register. The method also includes executing the device driver that performs operations of determining the changed value written to the position zero of the data bus register, obtaining the data from the position one of the data bus register based on the determination of the changed value, and changing the changed value to the designated value written to the position zero of the data bus register.

The details of one or more implementations are set forth in the accompanying drawings and the description below. Other features and advantages will be apparent from the description and drawings.

BRIEF DESCRIPTION OF THE DRAWINGS

Details of accessing device memory via a host bus interface are described with reference to the following Figures. The same numbers may be used throughout to reference like features and components that are shown in the Figures.

DETAILED DESCRIPTION

Computing devices, such as computers, mobile phones, tablet devices, digital cameras, multimedia devices, printers, and many other types of wired and wireless devices are implemented for Wi-Fi data communication. The computing devices are generally integrated with Wi-Fi chips of the wireless communication device, and the software that manages and controls the Wi-Fi wireless device includes a host device driver that executes on a host central processing unit (CPU) of the computing device (e.g., the main CPU of a mobile phone), and includes firmware that executes on the wireless communication device side (e.g., on the Wi-Fi chip). In the computing device, the host device driver and the firmware communicate with each other via one or more data buses, such as a secure digital input output (SDIO) bus.

Generally, data traffic in the form of control messages are exchanged between the host device driver on the mobile phone and the wireless device firmware via the data bus. As described herein, and merely for ease of discussion, a computing device, such as a mobile phone or tablet device, is referred to as the computing system to distinguish from a device, such as a digital camera device or wireless radio device, that is integrated in the computing system. The device firmware may become inoperable, which can stall or delay the control messages between the host device driver and the device firmware. In development, the device firmware can be connected via a Joint Test Action Group (JTAG) interface to determine run-time status and errors. With a JTAG interface, the variables, registers, stacks, etc. of the device firmware can be evaluated to determine detailed firmware status. However, JTAG is generally only available as a port on development boards, rather than in the commercial implementations, such as in a consumer mobile phone or tablet device.

Aspects of accessing device memory via a host bus interface provide that firmware memory can be transferred to a data bus register for access by the host device driver even when the device firmware stalls or becomes inoperable. The same information and data that would otherwise be obtainable with a JTAG interface can be obtained via the host bus interface by the device driver that accesses the data bus register on the device with the inoperable device firmware. The device firmware data can then be saved to a log file on the host computing system for access and evaluation, which improves debugging efficiencies and provides that bug issues can be accurately reproduced for evaluation.

While features and concepts of accessing device memory via a host bus interface can be implemented in any number of different devices, systems, environments, and/or configurations, aspects of accessing device memory via a host bus interface are described in the context of the following example devices, systems, and methods.

Figure 1:
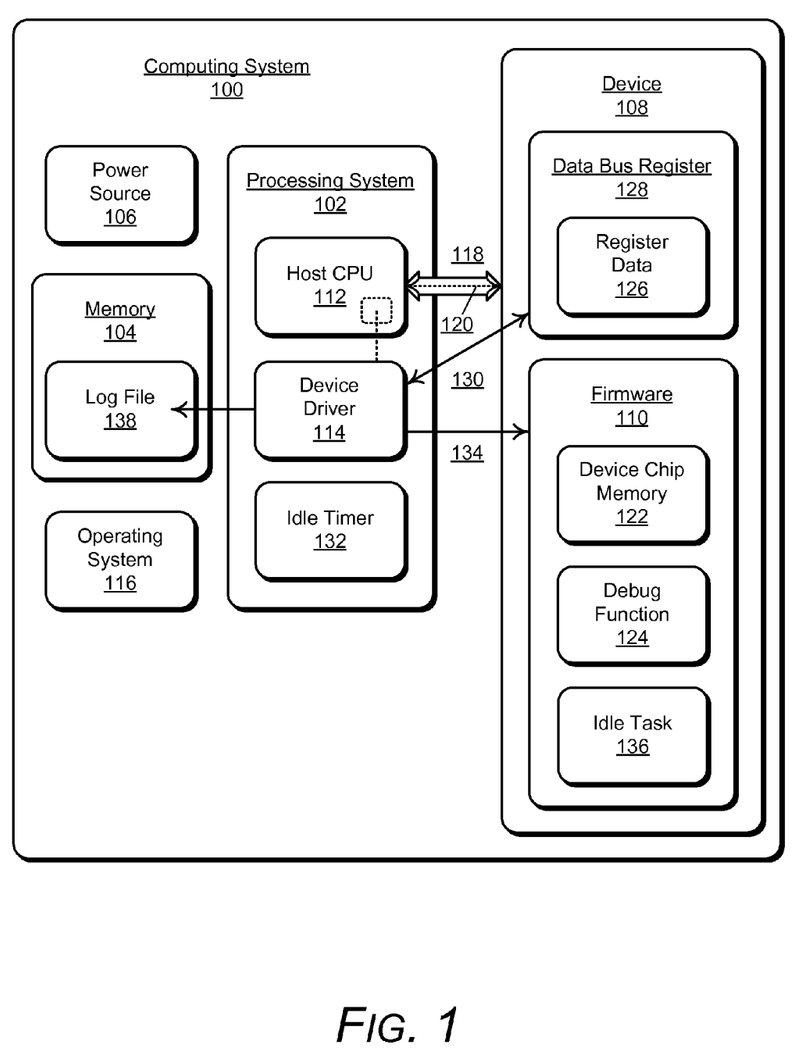
FIG. 1 illustrates an example computing system in which aspects of accessing device memory via a host bus interface can be implemented.

FIG. 1 illustrates an example computing system 100 in which aspects of accessing device memory via a host bus interface can be implemented. The example computing system 100 is representative of any one or combination of a mobile phone, tablet computer, digital camera, computing device, communication, entertainment, gaming, navigation, and/or other type of wired or portable electronic device. The computing system 100 can be implemented with various components, such as a processing system 102 and memory 104, a power source 106 (e.g., a battery) to power device components, and with any number and combination of different components as further described with reference to the example device shown in FIG. 5.

The computing system 100 includes a device 108, which may be implemented as any type of device, such as a camera device, navigation device, radio device, and any other type of device, hardware, and/or chipset that may be integrated in the computing system. In this example, the device 108 includes firmware 110 (e.g., memory, program code, and data) that controls operation and functions of the device. In implementations, the device 108 may be a wireless radio system, such as a Wi-Fi radio system that includes a radio device, antenna, chipset, and radio controller that is implemented for wireless communications technology. Generally, when operational, a radio controller of the Wi-Fi radio system scans for wireless signals from Wi-Fi access points that are within communication range, and the Wi-Fi radio system can communicatively-link to an access point for wireless communication via Wi-Fi.

The processing system 102 of the computing system 100 may include one or more central processing units (CPUs), such as a host CPU 112 of the computing system. The computing system 100 includes a device driver 114 that can be implemented as a software application or module, such as executable software instructions (e.g., computer-executable instructions) that are executable by the host CPU 112 of the computing system to implement aspects of accessing device memory via a host bus interface. The device driver 114 can be stored on computer-readable storage memory (e.g., the memory 104), such as any suitable memory device or electronic data storage implemented by the computing system.

In implementations, the device driver 114 may be a component of the device operating system 116, such as a functional driver of a wireless radio technology, or can be implemented as part of a wireless technology specific service on the computing system. Alternatively, the device driver 114 may be implemented as an independent application or module that is executable on the computing system 100 to manage and control the device 108. Generally, the device driver 114 may be implemented and/or described in the general context of software, firmware, hardware (e.g., fixed logic circuitry), applications, modules, or any combination thereof. In implementations, the device driver 114 may be implemented as a system-on-chip (SoC) in the computing system 100, such as described with reference to the example SoC shown in FIG. 2.

The device driver 114 executes on the host CPU 112 and exchanges control and data messages with the device 108 via a data bus 118, which is the host bus interface between the host CPU 112 and the device 108, and may be implemented as a secure digital input output (SDIO), a universal serial bus (USB), a peripheral component interconnect express (PCIE) bus, and the like. In the example implementation, the device 108 is a wireless Wi-Fi radio device, and the host device driver 114 and the device firmware 110 exchange control messages 120, such as commands, command responses, and events. A command can be initiated from the host device driver 114 to the device firmware 110 via the data bus 118, such as to direct an operation of the device. A response to the command is then communicated from the device firmware 110 to the host device driver 114 as an acknowledgement of the command. The device firmware 110 can also initiate an event control message to report a situation or status of the device 108 to the host device driver 114.

In operation, the control messages 120 are frequently exchanged via the data bus 118 (e.g., an SDIO) between the host device driver 114 and the device firmware 110. However, device errors may occur, in which case the communication of the control messages 120 between the host device driver 114 and the device firmware 110 is stalled, and the host device driver 114 cannot access the device chip memory 122 of the firmware 110 in the device 108. For example, the host device driver 114 may initiate a command to the device firmware 110 via the data bus 118, but not receive a response to the command as an acknowledgement of the command from the device firmware 110.

When communication of the control messages are stalled between the host device driver 114 and the device firmware 110, it is most likely that the firmware is not responsive and the device driver can no longer control the device 108. Generally, the firmware may stall due to: case(1), a deadlock and the firmware cannot proceed or provide a response, such as if a resource is not allocated and a task fails to execute; case(2) the firmware is stalled in an infinite loop due to a "while(1)" statement that is put in that error condition and does not process; or case(3) a memory exception occurs, such as caused by a memory overwrite or invalid memory access, and the firmware cannot execute.

In all of these cases of stalled firmware, conventional techniques do not provide the firmware 110 of the device 108 being able to communicate with the device driver 114 that is executed by the host CPU 112 of the computing system 100. However, in aspects of accessing device memory via a host bus interface, the firmware 110 of the device 108 implements a debug function 124 (e.g., "enter_debug_mode( )") that enables the firmware 110 to expose register data 126 that is dumped from the device chip memory 122 to a data bus register 128 on the device. In the on-going example implementation, the device 108 is a Wi-Fi radio device, and the host device driver 114 communicates with the device firmware 110 via the SDIO bus 118. In this implementation, the data bus register 128 is implemented as an SDIO register on the device 108, and the SDIO register can be accessed 130 by the device driver 114 even when the firmware 110 is stalled.

The computing system 100 includes an idle timer 132 that the device driver 114 can initiate when a command is communicated via the data bus 118 to the firmware 110 of the device 108. If the device driver 114 does not receive a response to the command in acknowledgement from the firmware 110 for a duration of time (e.g., ten seconds), then the device driver 114 initiates a trigger signal 134 that is communicated to the firmware 110. In all of the instances of the stalled firmware 110, the debug function 124 (e.g., "enter_debug_mode( )") is executed to transfer the memory content (e.g., from the device chip memory 122), as well as any other information, such as device registers, that may be communicated to the host device driver 114 in an extension of the protocol (e.g., the debug function 124) between the firmware 110 and the device driver 114 via the host bus interface.

In the instance of the firmware 110 being stalled as described in case(1) (e.g., a deadlock and the firmware cannot proceed), an idle task 136 runs in the firmware 110 when no other tasks are pending. In aspects of the described techniques, the firmware 110 receives the trigger signal 134 from the host device driver 114, and the debug function 124 initiates a firmware memory transfer to write-out data from the device chip memory 122 to the data bus register 128 where the host device driver 114 can then access the register data 126. In the case(1), the device firmware 110 may still be operating from the standpoint that the tasks are still getting scheduled. However, only the task that fails to be allocated requested resources, such as memory buffers, stalls and does not continue, waiting indefinitely for the resources to be available. The idle task 136 in the device firmware 110 has the lowest priority and only gets scheduled when other higher priority tasks are not scheduled. In this case(1), the idle task 136 can still execute and detect the trigger signal 134 from the host device driver 114, and then call the debug function 124 (e.g., "enter_debug_mode( )") to enter the firmware debug state.

In aspects of the described techniques, the trigger signal 134 that is initiated by the host device driver 114 can be implemented differently according to the type of the data bus 118 that is implemented between the host device driver 114 and the device firmware 110. In the on-going example implementation, the device 108 is a Wi-Fi radio device, and the host device driver 114 communicates with the device firmware 110 via the SDIO bus 118. An example of the host side functions and the device side functions in pseudo code is included below, and assumes an SDIO bus 118. Accordingly, the data bus register 128 is an SDIO scratch register implemented in the device 108, and the SDIO register 128 can be accessed 130 by the host device driver 114 using the SDIO CMD52, which is a data read command. The device firmware 110 can also access the SDIO register 128.

In implementations, the trigger signal 134 from the host device driver 114 can be written as "0xa" to the SDIO scratch register position zero (0). When the firmware 110 determines that the register position zero (0) has been written "0xa", the firmware 110 initializes the register position zero (0) value to any value other than the "0xa", and begins to transfer the memory content of the device chip memory 122. Transferring the memory content of the device chip memory 122 is also referred to as "dumping" the memory content of the device chip memory.

For example, the firmware 110 can start at the device chip memory address zero (0), read the memory address, write the value to the SDIO scratch register position one (1), and set the SDIO scratch register position zero (0) to "0xb". The host device driver 114 can read the SDIO scratch register position one (1) when the SDIO scratch register position zero (0) is set to "0xb" by the firmware 110. The host device driver 114 can read the SDIO scratch register position one (1) and then change the SDIO register position zero (0) back to "0xa" to indicate completion of reading the memory data at SDIO register position one (1). Next, the firmware 110 can write the value of the device chip memory address one (1) to the SDIO register position one (1) and again set the SDIO register position zero (0) to "0xb".

This process can be repeated until all of the device chip memory content has been written to the SDIO register, and read by the host device driver 114. The host device driver 114 can save the transferred register data 126 into a log file 138, which contains the same data as would be memory dumped via JTAG if that interface protocol was available. In this example, the device chip memory 122 is transferred to the SDIO register 128 and to the log file 138 by the host device driver 114 one byte of data at a time. However, in other implementations, and depending on the data bus register space, more than one byte of data may be transferred utilizing a similar technique. Additionally, the techniques described herein for accessing device memory via a host bus interface can be similarly implemented for other bus interfaces, such as a USB and a PCIE bus. For a USB implementation, the trigger signal 134 can be implemented as simple commands from the host device driver 114 sent to a USB control endpoint (e.g., a logical endpoint), and the firmware 110 executes in a "while loop" to monitor control endpoint transactions and responds accordingly.

In the instance of the firmware 110 being stalled as described in case(2) (e.g., the firmware 110 is stalled in an infinite loop), the stalled task has a higher priority than the idle task 136 in the firmware 110, which precludes scheduling the idle task. The firmware 110 can be stalled in an infinite loop due to a "while(1)" statement that is put in that error condition and does not process. In aspects of the described techniques, the firmware 110 is never stalled in a "while(1)" loop since each instance of a "while(1)" is already replaced by "enter_debug_mode( )" (e.g., the debug function 124), which can detect the trigger signal 134 from the host device driver 114, and which initiates memory access after the trigger signal is detected.

In the instance of the firmware 110 being stalled as described in case(3) (e.g., a memory exception occurs), a CPU exception may be triggered, such as an unknown instruction exception, an invalid memory access exception, and the like. In aspects of the described techniques, an exception handler for the particular exception calls the "enter_debug_mode( )" (e.g., initiates a function call to the debug function 124), which can detect the trigger signal from the host device driver 114 and initiates the memory access.

A pseudo code example of the host side functions (e.g., the host CPU 112 of the computing system 100 that executes the host device driver 114) as described above with reference to FIG. 1 are listed below:

```
/*this function sends a command to firmware and starts a
    timer after sending the command*/
send_command( )
{
    Call bus interface function to write command down to
        firmware;
    Start timer with handler timeout_handler( );
}
/*this handler will be called if a command response
    doesn't come back before timer fires*/
timeout_handler( )
{
    length=0;
    /*TOTAL_LEN is the total length of firmware
        memory*/
    do {
        /*write 0xa to SDIO scratch reg 0, which serves as
            a trigger signal*/
        Write 0xa to SDIO scratch reg 0;
        /*wait until reg 0 becomes a value other than 0xa*/
        while(read(0)==0xa);
        /*read SDIO scratch reg 1 and save to x*/
        x=read(1);
        Append x to logfile;
        length++;
    } while (length !=TOTAL_LEN)
}
/*this function will be called once a cmd response is back
    from firmware*/
recive_cmd_resp( )
{
    Stop the timer started in send_command( )
}
```

A pseudo code example of the device side functions (e.g., the firmware 110 of the device 108) as described above with reference to FIG. 1 are listed below:

```
/*the core function, which only gets called when 3 cases
    mentioned earlier happen*/
enter_dubug_mode( )
{
    length=0;
    do}
        /*wait until SDIO scrach reg 0 becomes 0xa*/
        while(read(0) !=0xa);
        /*read memory location "length", and save the value to
            x*/
        x=read(length);
        /*put the value x into SDIO scratch reg 1*/
        write x to reg 1;
        /*write 0xb to SDIO reg 0, telling host value is ready
            at reg 1*/
        write 0xb to reg 0;
        length++;
    } while (length !=TOTAL_LEN)
}
/*call enter_debug_mode( ) in idle_task to detect situa-
    tions like dead_lock*/
idle_task( )
{
    while(1)
    }
        do something;
        . . .
        /*keep monitoring scratch reg 0, and if detected 0xa,
            call enter_debug_mode*/
        if(read(0)==0xa)
            enter_debug_mode( );
        . . .
        do something;
    }
}
```

```
/*call enter_debug_mode( ) where while(1) is originally
    used to detect some fatal errors which will definitely
    results in cmd timeout*/
task_a( )
{
    while(1)
    {
        do_something;
        ...
        if (something wrong)
            /*replace while(1) with enter_debug_mode( )*/
            //while(1)
            enter_debug_mode( )
        ...
        do_something;
    }
}
/*call enter_debug_mode( ) in exception handlers, which
    mainly get triggered in cases like invalid memory
    accesses, unknown instructions, etc*/
exception_handlers( )
{
    handle exceptions;
    enter_debug_mode( );
}
```

Figure 2:
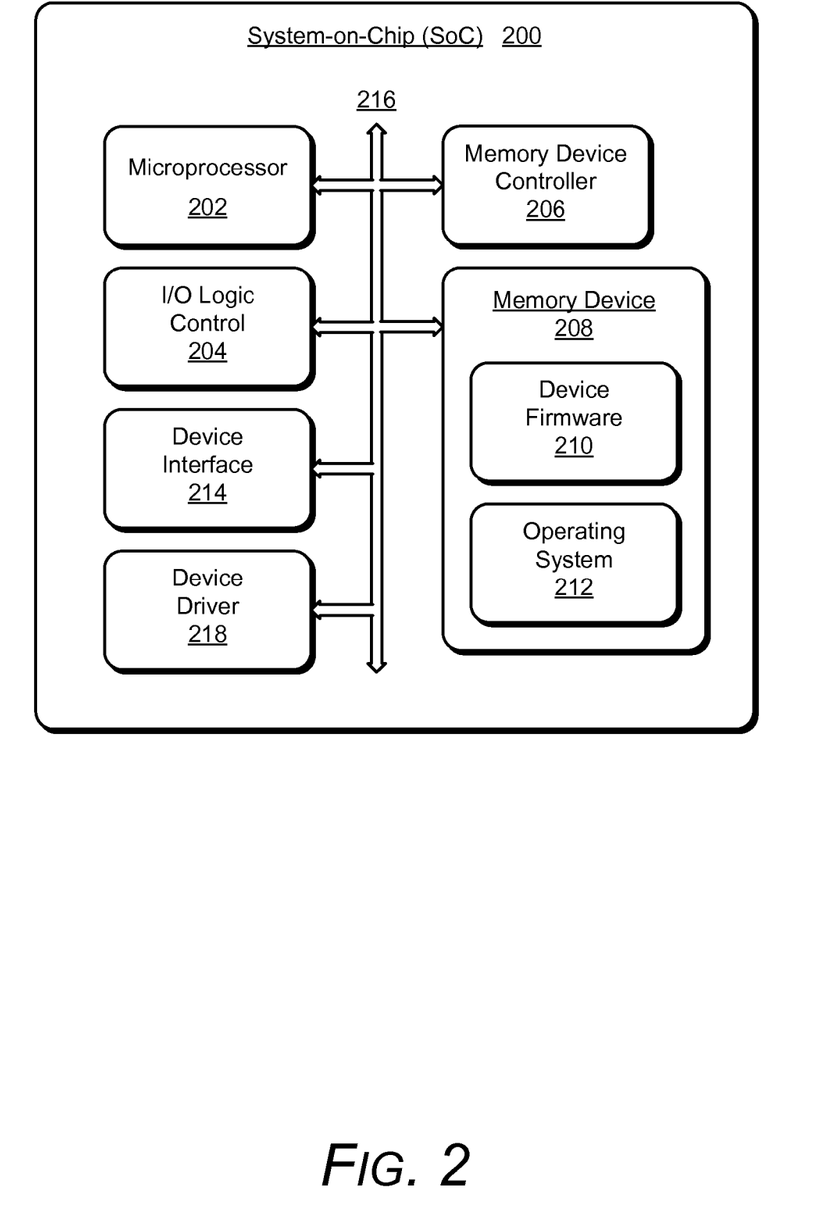
FIG. 2 illustrates an example system-on-chip (SoC) environment in which aspects of accessing device memory via a host bus interface can be implemented.

FIG. 2 illustrates an example system-on-chip (SoC) 200, which can implement various aspects of accessing device memory via a host bus interface as described herein. The SoC may be implemented in any type of computing system, such as the computing system 100 described with reference to FIG. 1 that may be implemented as any type of computer, mobile phone, tablet device, digital camera, multimedia device, printer, or similar device. The SoC 200 can be integrated with electronic circuitry, a microprocessor, memory, input-output (I/O) logic control, communication interfaces and components, as well as other hardware, firmware, and/or software to implement a computing system 100.

In this example, the SoC 200 is integrated with a microprocessor 202 (e.g., any of a microcontroller or digital signal processor) and input-output (I/O) logic control 204 (e.g., to include electronic circuitry). The SoC 200 includes a memory device controller 206 and a memory device 208, such as any type of a nonvolatile memory and/or other suitable electronic data storage device. The SoC can also include various firmware and/or software, such as device firmware 210 and an operating system 212 that is maintained by the memory and executed by the microprocessor.

The SoC 200 includes a device interface 214 to interface with a device or other peripheral component, such as when installed in the computing system 100 as described herein. The SoC 200 also includes an integrated data bus 216 that couples the various components of the SoC for data communication between the components. The data bus in the SoC may also be implemented as any one or a combination of different bus structures and/or bus architectures.

In aspects of accessing device memory via a host bus interface, the SoC 200 includes a host device driver 218 that can be implemented as computer-executable instructions maintained by the memory device 208 and executed by the microprocessor 202. Alternatively, the host device driver 218 can be implemented as hardware, in firmware, fixed logic circuitry, or any combination thereof that is implemented in connection with the I/O logic control 204 and/or other processing and control circuits of the SoC 200.

Examples of the host device driver 218, as well as corresponding functionality and features, are described with reference to the host device driver 114 shown in FIG. 1.

Example methods 300 and 400 are described with reference to respective FIGS. 3 and 4 in accordance with one or more aspects of accessing device memory via a host bus interface. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
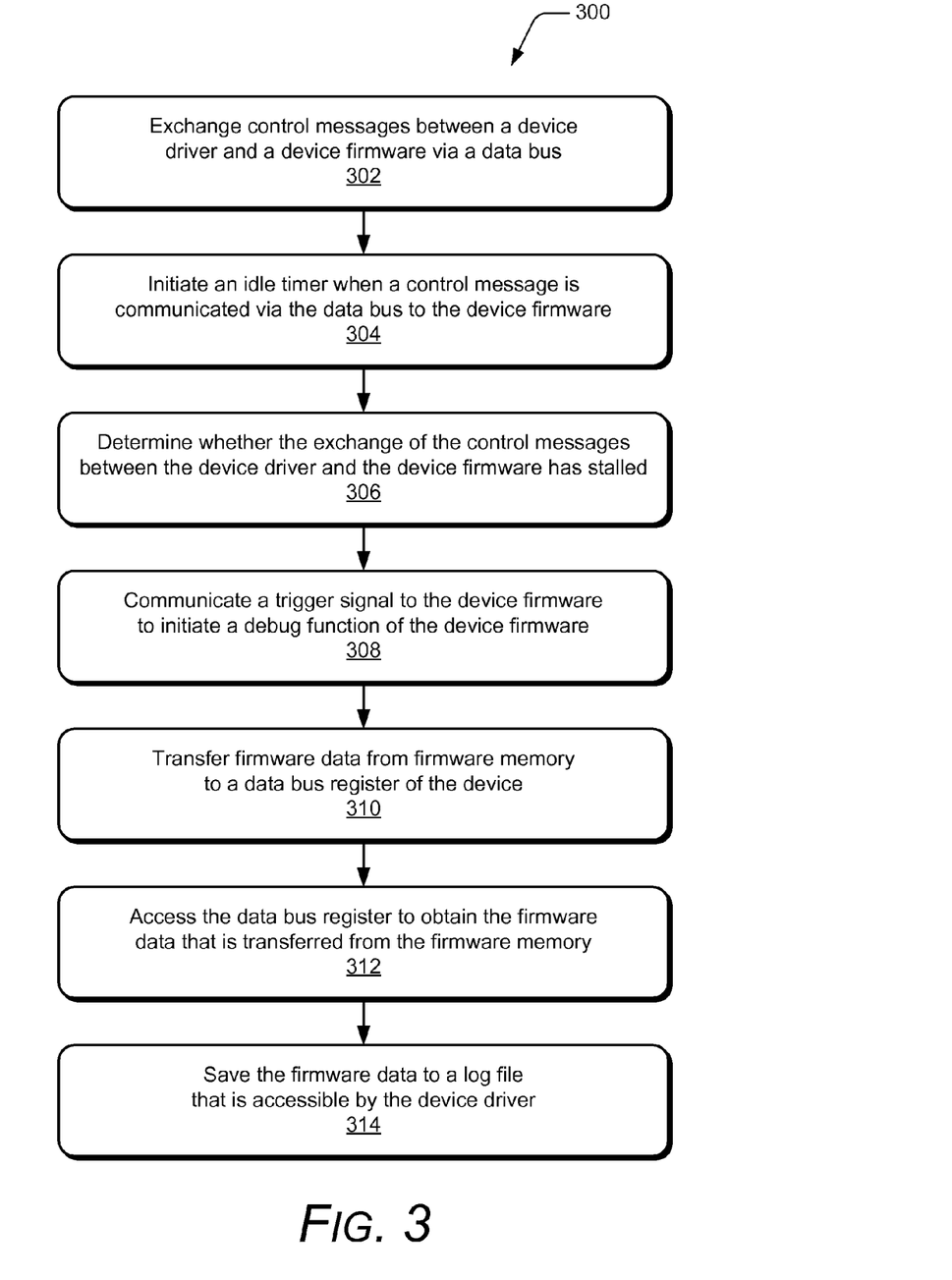
FIG. 3 illustrates example methods of accessing device memory via a host bus interface in accordance with one or more aspects.

FIG. 3 illustrates example method(s) 300 of accessing device memory via a host bus interface, and is described with reference to the computing system 100 shown in FIG. 1. The order in which the method is described is not intended to be construed as a limitation, and any number of the described method operations can be combined in any order to implement the method, or an alternate method.

At 302, control messages are exchanged between a device driver and a device firmware via a data bus. For example, the computing system 100 (FIG. 1) includes the device driver 114 that executes on the host CPU 112 and exchanges control messages with the device firmware 110 of the device 108 via the data bus 118, such as commands, command responses, and events. In implementations, the device 108 is a Wi-Fi radio device integrated in the computing system 100 (e.g., a mobile phone), the data bus 118 is an SDIO bus, and the data bus register 128 is an SDIO scratch register.

At 304, an idle timer is initiated when a control message is communicated via the data bus to the device firmware. For example, the device driver 114 of the computing system 100 initiates the idle timer 132 when a command is communicated via the data bus 118 to the firmware 110 of the device 108.

At 306, determine whether the exchange of the control messages between the device driver and the device firmware has stalled. For example, the device driver 114 of the computing system 100 determines that the exchange of the control messages between the device driver and the device firmware has stalled if the device driver 114 does not receive a response to a command in acknowledgement from the firmware 110 for a duration of time (e.g., ten seconds). The device driver 114 can determine that the exchange of the control messages has stalled, which may be due to any one of a deadlock of the firmware, an infinite loop encountered in an error condition of the device firmware, and/or a memory exception of the device firmware.

At 308, a trigger signal is communicated to the device firmware, and a debug function of the device firmware is initiated and, at 310, firmware data is transferred from firmware memory to a data bus register of the device. For example, the device driver 114 of the computing system 100 initiates the trigger signal 134 that is communicated to the firmware 110 if the device driver 114 does not receive the response to a command in acknowledgement from the firmware 110 for the duration of time (at 306), and the debug function 124 of the device firmware 110 is initiated.

In aspects of the described techniques, the trigger signal is written as a designated value in position zero of the data bus register 128, the debug function 124 determines the designated value written to position zero of the data bus register 128, and based on the designated value, the debug function transfers the firmware data from the firmware memory (e.g., the device chip memory 122) to the data bus register. Alternatively, the debug function 124 is initiated due to an infinite loop encountered in an error condition of the device firmware 110, and the debug function 124 detects the trigger signal 134 that is communicated to the device firmware 110 from the host device driver 114. Alternatively, the debug function 124 is called by an exception handler due to a memory exception of the device firmware 110, and the debug function 124 detects the trigger signal 134 that is communicated to the device firmware 110 from the host device driver 114.

At 312, the data bus register is accessed to obtain the firmware data that is transferred from the firmware memory. For example, the device driver 114 of the computing system 100 accesses the data bus register 128 to obtain the firmware data (e.g., written to the data bus register as the register data 126). In the example implementation of a Wi-Fi radio device 108 integrated in the computing system 100 (e.g., a mobile phone), and the data bus register 128 is an SDIO scratch register, the device driver 114 accesses the SDIO scratch register to obtain the firmware data using an SDIO data read command.

At 314, the firmware data is saved to a log file that is accessible by the device driver. For example, the device driver 114 of the computing system 100 saves the transferred register data 126 into the log file 138, which then contains the same data as would be memory dumped via JTAG if that interface protocol was available in a commercial implementation of the computing system 100 (e.g., as a mobile phone or tablet device).

Figure 4:
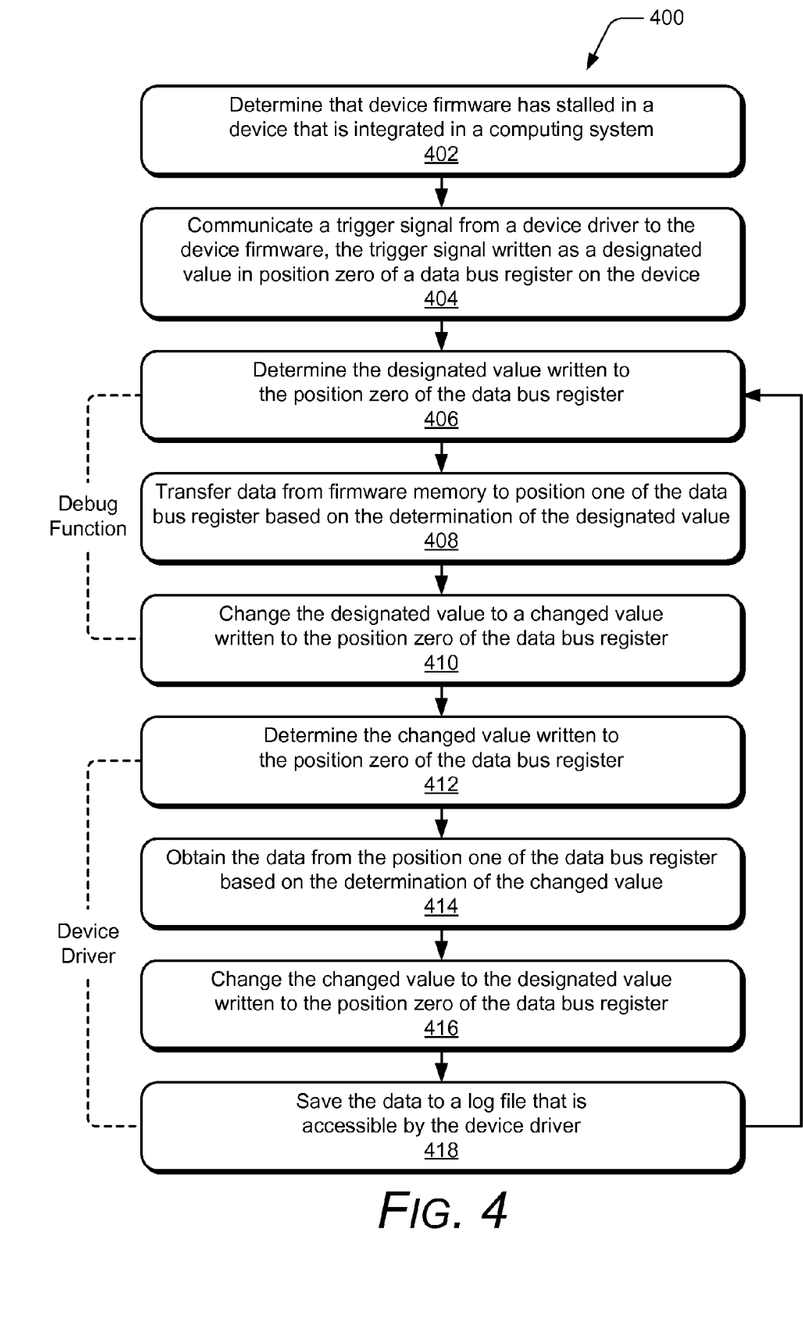
FIG. 4 illustrates example methods of accessing device memory via a host bus interface in accordance with one or more aspects.

FIG. 4 illustrates example method(s) 400 of accessing device memory via a host bus interface, and is described with reference to the computing system 100 shown in FIG. 1. The order in which the method is described is not intended to be construed as a limitation, and any number of the described method operations can be combined in any order to implement the method, or an alternate method.

At 402, determine that device firmware has stalled in a device that is integrated in a computing system. For example, the device driver 114 of the computing system 100 can communicate a command to the firmware 110, and determine that the exchange of control messages between the device driver 114 and the device firmware 110 has stalled if the device driver 114 does not receive a response to a command in acknowledgement from the firmware 110 for a duration of time (e.g., ten seconds). The device driver 114 determines that the exchange of the control messages has stalled, which may be due to any one of a deadlock of the firmware, an infinite loop encountered in an error condition of the device firmware, and/or a memory exception of the device firmware.

At 404, a trigger signal is communicated from a device driver to the device firmware, where the trigger signal is written as a designated value in position zero of a data bus register on the device. For example, the device driver 114 of the computing system 100 initiates the trigger signal 134 that is communicated to the firmware 110, and the trigger signal 134 is written as the designated value "0xa" to the SDIO scratch register position zero (0) (e.g., the data bus register 128 of the device 108).

At 406, determine the designated value written to the position zero of the data bus register. For example, the debug function 124 of the device firmware 110 determines that the register position zero (0) of the SDIO scratch register 128 has been written with the designated value "0xa".

At 408, data is transferred from firmware memory to position one of the data bus register based on the determination of the designated value. For example, the debug function 124 of the device firmware 110 starts at the device chip memory 122 address zero (0), reads the memory address, and writes the value to the register position one (1) of the SDIO scratch register 128.

At 410, the designated value is changed to a changed value written to the position zero of the data bus register. For example, the debug function 124 of the device firmware 110 initializes the register position zero (0) value of the SDIO scratch register 128 to any value other than the designated value "0xa", such as the SDIO scratch register position zero (0) can be set to the changed value "0xb".

At 412, determine the changed value written to the position zero of the data bus register. For example, the device driver 114 executed by the host CPU 112 on the computing system 100 determines that the register position zero (0) of the SDIO scratch register 128 has been written with the changed value "0xb".

At 414, the data is obtained from the position one of the data bus register based on the determination of the changed value. For example, the device driver 114 reads the position one (1) of the SDIO scratch register 128 when the SDIO scratch register position zero (0) is set to the changed value "0xb" by the firmware 110.

At 416, the changed value is changed back to the designated value written to the position zero of the data bus register. For example, the device driver 114 changes the SDIO register position zero (0) back to the designated value "0xa" to indicate completion of reading the memory data at SDIO register position one (1).

At 418, the data is saved to a log file that is accessible by the device driver. For example, the device driver 114 saves the transferred register data 126 into the log file 138, which then contains the same data as would be memory dumped via JTAG if that interface protocol was available in a commercial implementation of the computing system 100 (e.g., as a mobile phone or tablet device).

The method 400 then continues to repeat the operations 406-410 of the debug function 124 to transfer the data from the firmware memory (e.g., the device chip memory 122) to the data bus register 128. The method also continues to repeat the operations 412-418 of the device driver 114 to obtain the data (e.g., the register data 126) from the data bus register 128.

Figure 5:
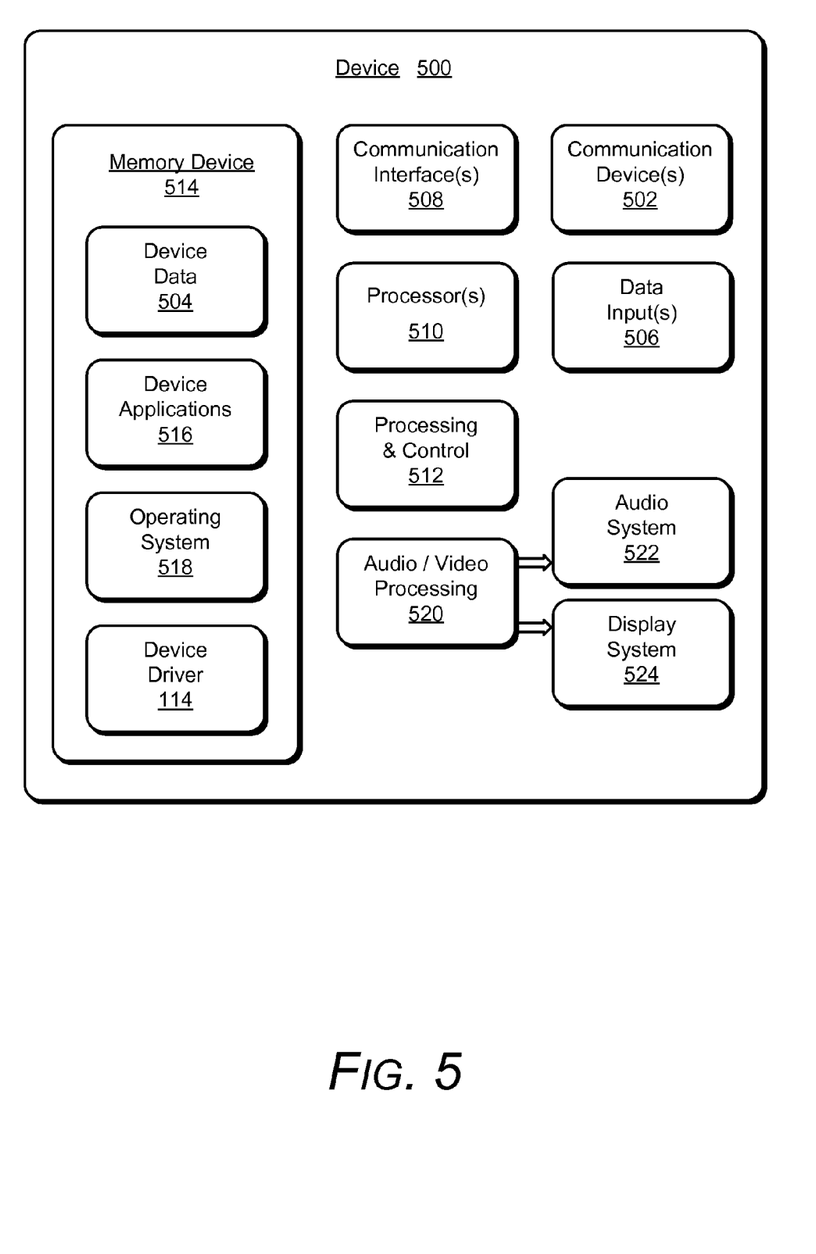
FIG. 5 illustrates various components of an example device that can implement aspects of accessing device memory via a host bus interface.

FIG. 5 illustrates various components of an example device 500 that can be implemented as any of the devices or systems described with reference to the previous FIGS. 1-4, such as any type of a computing system 100 as described with reference to FIG. 1. The device may also be implemented to include the example system-on-chip (SoC) described with reference to FIG. 2. The device may be associated with a user (i.e., a person) and/or an entity that operates the device such that a device describes logical devices that include users, software, firmware, hardware, and/or a combination of devices.

The device 500 includes communication devices 502 that enable wired and/or wireless communication of device data 504, such as received data, data that is communicated between devices, data packets of the data, etc. The device 500 also includes one or more data inputs 506 via which any type of data, media content, and/or inputs can be received, such as user-selectable inputs and any other type of audio, video, and/or image data received from any content and/or data source. The data inputs 506 may include USB ports, coaxial cable, and other serial or parallel connectors (including internal connectors) for flash memory, DVDs, CDs, and the like. The data inputs can be used to couple the device to internal and/or external components, peripherals, and accessories, such as keyboards, microphones, cameras, and any other types of devices.

The device 500 also includes communication interfaces 508, such as any one or more of a serial, parallel, network, or wireless interface. The communication interfaces provide a connection and/or communication links between the device and a network by which other electronic, computing, and communication devices communicate data with the device. Although not shown, the device can include a system bus or data transfer system that couples the various components within the device, such as described with reference to the data bus shown in FIG. 1. A system bus can include any one or combination of different bus structures, such as a memory bus or memory controller, a peripheral bus, a universal serial bus, and/or a processor or local bus that utilizes any of a variety of bus architectures.

The device 500 includes one or more processors 510 (e.g., any of microprocessors, controllers, and the like), or a processor and memory system (e.g., implemented in an SoC), which processes computer-executable instructions to control the operation of the device. Alternatively or in addition, the device can be implemented with any one or combination of software, hardware, firmware, or fixed logic circuitry that is implemented in connection with processing and control circuits which are generally identified at 512.

The device 500 also includes one or more memory devices 514 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device. Computer-readable storage media can be any available medium or media that is accessed by a computing device.

A memory device 514 provides data storage mechanisms to store the device data 504, other types of information and/or data, and device applications 516. For example, an operating system 518 can be maintained as a software application with the memory device and executed on the processors. The device applications may also include a device manager or controller, such as any form of a control application, software application, signal processing and control module, code that is native to a particular device, a hardware abstraction layer for a particular device, and so on. In this example, the device applications 516 also include the device driver 114 to implement aspects of accessing device memory via a host bus interface when the device 500 is implemented as the computing system 100. Although shown implemented as a software application or module in the example device 500, the device driver 114 may be implemented in the general context of software, firmware, hardware (e.g., fixed logic circuitry), or any combination thereof.

The device 500 may also include an audio and/or video processing system 520 that generates audio data for an audio system 522 and/or generates display data for a display system 524. The audio system and/or the display system may include any devices that process, display, and/or otherwise render audio, video, display, and/or image data. In implementations, the audio system and/or the display system are external components to the device. Alternatively, the audio system and/or the display system are integrated components of the example device.

Although aspects of accessing device memory via a host bus interface have been described in language specific to features and/or methods, the appended claims are not necessarily limited to the specific features or methods described. Rather the specific features and methods are disclosed as example implementations of accessing device memory via a host bus interface, and other equivalent features and methods are intended to be within the scope of the appended claims. Further, various different aspects are described and it is to be appreciated that each described aspect can be implemented independently or in connection with one or more other described aspects.

What is claimed is:

1. A computing system, comprising:
   a processor;
   a device that is integrated in the computing system, wherein the device includes device firmware configured to control operation of the device; and
   a device driver, executable by the processor of the computing system to
   (i) monitor whether an exchange of control messages between the device driver and the device firmware via a data bus has stalled, and
   (ii) in response to determining that the exchange of the control messages between the device driver and the device firmware via the data bus has stalled,
     (a) initiate a debug function of the device firmware, the debug function configured to transfer firmware data from firmware memory to a data bus register of the device, and
     (b) access the data bus register to obtain the firmware data that is transferred from the firmware memory.

2. The computing system as recited in claim 1, wherein:
   the device is a Wi-Fi radio device;
   the data bus is an SDIO bus, and the data bus register is an SDIO scratch register; and
   the device driver is configured to access the SDIO scratch register to obtain the firmware data using an SDIO data read command.

3. The computing system as recited in claim 1, wherein the device driver is configured to:
   determine that the exchange of the control messages has stalled;
   communicate a trigger signal to be written as a designated value in position zero of the data bus register; and
   the debug function is configured to determine the designated value written to the position zero of the data bus register, and based on the designated value, transfer the firmware data from the firmware memory to the data bus register.

4. The computing system as recited in claim 1, wherein:
   the device driver is configured to determine that the exchange of the control messages has stalled, and communicate a trigger signal to the device firmware; and
   the debug function is initiated due to an infinite loop encountered in an error condition of the device firmware, and the debug function detects the trigger signal.

5. The computing system as recited in claim 1, wherein:
the device driver is configured to determine that the exchange of the control messages has stalled, and communicate a trigger signal to the device firmware; and
the debug function is initiated by an exception handler due to a memory exception of the device firmware, and the debug function detects the trigger signal.

6. The computing system as recited in claim 1, wherein the device driver is configured to:
initiate an idle timer when a control message is communicated via the data bus to the device firmware; and
communicate a trigger signal to the device firmware to initiate the debug function after a duration of time without receiving an acknowledgement from the device firmware.

7. The computing system as recited in claim 1, wherein the device driver is configured to:
obtain the firmware data from the data bus register; and
save the firmware data to a log file that is accessible by the device driver.

8. The computing system as recited in claim 1, wherein the processor is a host CPU embodied on a system-on-chip (SoC) to implement the device driver.

9. A method, comprising:
exchanging control messages between a device driver and a device firmware via a data bus, the device driver being executed by a processor of a computing system, and the device firmware implemented in a device that is integrated in the computing system;
monitoring whether the exchange of the control messages between the device driver and the device firmware has stalled, and in response to the exchange of the control messages between the device driver and the device firmware being stalled,
(i) initiating a debug function of the device firmware, the debug function transferring firmware data from firmware memory to a data bus register of the device; and
(ii) accessing the data bus register to obtain the firmware data that is transferred from the firmware memory.

10. The method as recited in claim 9, wherein:
the device is a Wi-Fi radio device;
the data bus is an SDIO bus and the data bus register is an SDIO scratch register; and
accessing the data bus register comprises accessing the SDIO scratch register to obtain the firmware data using an SDIO data read command.

11. The method as recited in claim 9, further comprising:
determining that the exchange of the control messages has stalled;
communicating a trigger signal to be written as a designated value in position zero of the data bus register; and
wherein the debug function determines the designated value written to the position zero of the data bus register, and based on the designated value, transfers the firmware data from the firmware memory to the data bus register.

12. The method as recited in claim 9, further comprising:
determining that the exchange of the control messages has stalled;
communicating the trigger signal to the device firmware;
wherein the debug function is initiated due to an infinite loop encountered in an error condition of the device firmware, and the debug function detects the trigger signal.

13. The method as recited in claim 9, further comprising:
determining that the exchange of the control messages has stalled;
communicating the trigger signal to the device firmware;
wherein the debug function is initiated by an exception handler due to a memory exception of the device firmware, and the debug function detects the trigger signal.

14. The method as recited in claim 9, further comprising:
initiating an idle timer when a control message is communicated via the data bus to the device firmware; and
communicating a trigger signal to the device firmware to initiate the debug function after a duration of time without receiving an acknowledgement from the device firmware.

15. The method as recited in claim 9, further comprising:
obtaining the firmware data from the data bus register; and
saving the firmware data to a log file that is accessible by the device driver.

16. A method, comprising:
determining that device firmware has stalled in a device that is integrated in a computing system;
communicating a trigger signal from a device driver to the device firmware, the trigger signal written as a designated value in position zero of a data bus register on the device;
executing a debug function of the device firmware that performs operations comprising:
(i) determining the designated value written to the position zero of the data bus register;
(ii) transferring data from firmware memory to position one of the data bus register based on the determination of the designated value; and
(iii) changing the designated value to a changed value written to the position zero of the data bus register;
executing the device driver that performs operations comprising:
determining the changed value written to the position zero of the data bus register;
obtaining the data from the position one of the data bus register based on the determination of the changed value; and
changing the changed value to the designated value written to the position zero of the data bus register.

17. The method as recited in claim 16, further comprising:
repeating the operations of the debug function to transfer the data from the firmware memory to the data bus register; and
repeating the operations of the device driver to obtain the data from the data bus register.

18. The method as recited in claim 16, further comprising:
obtaining the data from the data bus register; and
saving the data to a log file that is accessible by the device driver.

19. The method as recited in claim 16, wherein determining that the device firmware has stalled comprises determining that an exchange of control messages between the device driver and the device firmware has stalled.

20. The method as recited in claim 16, wherein determining that the device firmware has stalled comprises determining that an exchange of control messages between the device driver and the device firmware has stalled, the exchange of the control messages stalled due to one of:
a deadlock of the firmware;
an infinite loop encountered in an error condition of the device firmware; or
a memory exception of the device firmware.

* * * * *